Patented May 5, 1936

2,039,822

UNITED STATES PATENT OFFICE 2,039,822

HARD COMPOSITION OF MATTER

Philip M. McKenna, Unity Township, Westmoreland County, Pa., assignor to Vanadium-Alloys Steel Company, Latrobe, Pa., a corporation of Pennsylvania No Drawing. Application May 2, 1933, Serial No. 668,984

3 Claims. (Cl. 75—136)

This patent application is in part a continuation of my pending patent application Serial No. 566,218, filed in the United States Patent Office October 1, 1931, which has become Patent No. 2,021,576, dated Nov. 19, 1935 and also in part a continuation of my pending patent application Serial No. 620,299, filed in the United States Patent Office June 30, 1932, which has become Patent No. 2,011,369, dated August 13, 1935.

My improved composition is intended to be used for a number of purposes. Thus it is particularly advantageous as a material for metal-cutting tools, especially steel cutting tools, also for the manufacture of drawing dies and the like, and for other purposes where resistance to wear is a primary object.

Another purpose for which my composition may be advantageously employed is for the manufacture of measuring gauges where a low coefficient of expansion and contraction in the presence of changing temperatures is highly important and wherein antifriction qualities are desired, as for instance to prevent scratching or marring the surfaces on which the gauges are applied.

My improved composition has also high corrosion-resisting properties when exposed to such corrosive agents as the weather, acid fumes and other solutions or substances which are corrosive to ordinary metals, such as iron, steel, stainless iron and steel, Monel metal, nickel, bronze and the like.

Previously known hard compositions have been made by cementing tungsten carbide particles with not more than 20% of cobalt, usually from 8% to 13% of cobalt being used. Such compositions are harder than steel, but when they are used as points of lathe tools for cutting steel they fail because of what is known as "cratering" wherein the steel chip from the work in passing rapidly over the cutting point of the tool wears a hollow or dished-shape depression in the top surface of the tool point, which hollow or depression enlarges during the operation of the tool until it extends to the cutting edge, rendering the latter of a fragile shape and resulting in failure by breaking off the edge.

Thus tungsten-carbide-cobalt-cemented tools are serviceable for cutting cast iron and brass because "cratering" is not so pronounced in such cases as where a steel chip is being produced, such a chip generally curling to a sufficient extent to contact and produce wear somewhat back of the cutting edge.

Tools formed of my improved composition when cutting steel resist this kind of wear and therefore are not subject to cratering and last at least ten times as long before requiring sharpening. Further evidence of the superiority of my improved composition for steel cutting tools is demonstrated by the fact that the steel shanks which support the hard composition tips do not heat up as do the shanks supporting tips of the tungsten carbide cobalt cemented type. Tools of the latter type become so hot that the steel shank becomes blue around the tip, while tools tipped with my composition will remain cool and are not discolored as an effect of the heating.

Again, an electric meter on a motor-driven lathe will show a less current consumption when a tool of my improved composition is being used than it will when a tungsten-carbide-cobalt-cemented tool is used to do the same work in cutting steel. In other words, at the same speed, feed and depth of cut, less energy is dissipated in frictional heat when my tool is used.

Again, steel cutting tools have been formed by cementing tantalum carbide particles with nickel, the proportion of nickel varying from 3% to 15%. When the nickel is added in the lower amounts the tools chip badly when cutting steel, and where the higher limits of the nickel are approached the tool wears out rapidly.

In United States Letters Patent No. 1,848,899, issued on March 8, 1932, I disclose a hard composition suitable for these purposes comprising from 29% to 69% of tungsten metal and from 71% to 31% of tantalum carbide.

While this composition has numerous advantages, I have found that in certain cases, and particularly in the manufacture of steel-cutting tools for turning steel at a very high speed with light cuts, it is very advantageous to increase the proportion of the tantalum carbide compared to that of the tungsten metal. However, I have found that in the case of such increase the tungsten metal cannot be successfully added merely in the form of grains of such metal powder, which grains usually vary in size from about two microns to ten microns in diameter with a mean particle size of about five microns.

When I form my composition with as low as 4% of tungsten and with up to 90% of tantalum carbide I find that it is necessary that the tungsten in the final composition be in a finely divided colloidal form. I thus am enabled to form a very tough and durable tool material comprising the particles of tantalum carbide and tungsten metal. In my patent application Serial No. 566,218, filed in the United States Patent Office on October 1, 1931, I disclose a method in which such finely divided colloidal tungsten metal may be obtained in the hard composition—that is by the reaction of $W_2C+Zr$, obtaining $2W+ZrC$.

Again in my patent application Serial No. 620,299, filed in the United States Patent Office June 30, 1932, I disclose the precipitation of the tungsten metal in a finely divided colloidal form in the composition out of a tungsten-nickel solution or compound.

In both cases the tungsten is associated in unmelted relation with the tantalum carbide.

As little as 4% of tungsten may be used and as much as 90% of tantalum carbide. Again, as little as 20% of tantalum carbide may be used and as much as 80% of tungsten.

Suitable heat treatments may be employed to precipitate the finely divided tungsten from its solid solution with another metal or metals For example when the tungsten is dissolved in an alloy with 20% to 75% iron and 10% to 30% cobalt in the alloy it may be heat treated by quenching from about 2400° F. and then re-heating to about 1200° F. for a length of time sufficiently long to precipitate the tungsten out of solution.

Investigation shows that the constituents tantalum carbide and tungsten remain as such unless and until the constituents are heated to or above their melting points, whereupon the equilibrium reverses and the carbon leaves the tantalum and combines with the tungsten, thus resulting in tantalum metal and tungsten carbide. Therefore these melted compositions are not largely characteristically composed of tantalum carbide and tungsten but of tantalum metal and tungsten carbide, a composition which does not possess the valuable properties of my composition.

Compositions having the higher limits of tantalum carbide, that is above 71%, are mechanically strong only when the tungsten is present in a finely divided colloidal and finely dispersed condition, and such finely divided colloidal tungsten metal may be formed from another phase than tungsten itself, such as from a carbide of tungsten, from a nitride of tungsten, or from a tungsten-alloy phase from which the nascent tungsten in a finely dispersed form is produced, as for instance by the processes disclosed in my above mentioned patent application.

In such cases under the conditions of heat treatment the tungsten metal is prevented from grain growth to a size ordinarily encountered in tungsten metal powder averaging about five microns by its dispersal throughout the other constituents of the final composition.

The presence of other hard carbides, such as tungsten carbide, zirconium carbide, hafnium carbide, columbium carbide, molybdenum carbide, titanium carbide, or other hard nitrides or borides, is not necessarily detrimental to my composition, nor is the presence of a certain minimum amount of metal which may be employed to carry the tungsten and to produce and maintain it in a dispersed colloidal condition. However, such metals should not be present in amounts greater than is necessary to carry the colloidal tungsten, for they have a tendency to soften the composition. Thus not more than 12% of nickel or 16% of cobalt should be present, and in case a softer metal of even lower melting point like copper or silver were present, the permissible quantity remaining in the composition would be much lower, say less than 3%.

Conversely if a metal of higher melting point or greater hardness be present, such as palladium, or rhodium, or rhuthenium, or a metal of the platinum group, a greater percentage may be tolerated without seriously impairing the hardness of the composition. Thus up to 20% of palladium would not be harmful.

A number of other methods of producing the finely divided colloidal tungsten metal in addition to those disclosed in my said patent applications may be employed in the manufacture of my composition. Thus the colloidal tungsten metal may be formed from a liquid solution by electrolysis of a tungsten salt, for instance using a mercury cathode into which the tungsten and possibly another metal, such as nickel or iron, might be electroplated, the mercury subsequently vaporized and the colloidal tungsten with or without another metal or metals mixed with or dispersed throughout the tantalum carbide and subjecting the mixture to pressure and to temperatures sufficient to form the composition into a mechanically coherent and durable body suitable for tool material, but below temperatures high enough to reverse the chemical equilibrium. For instance, final compositions containing the following constituents may be formed to produce a hard composition possessing the highly valuable qualities desired:—

*Example No. 1*

| | Per cent |
|---|---|
| Tungsten | 4 |
| Nickel | 4 |
| Tantalum carbide | 90 |
| Other carbides or metals | 2 |

*Example No. 2*

| | Per cent |
|---|---|
| Tungsten | 10 |
| Tantalum carbide | 64 |
| Cobalt | 8 |
| Other carbides or melts | 18 |

*Example No. 3*

| | Per cent |
|---|---|
| Tungsten | 4 |
| Tantalum carbide | 80 |
| Palladium | 16 |

*Example No. 4*

| | Percent |
|---|---|
| Tungsten | 40 |
| Tantalum carbide | 58 |
| Other carbides | 1.5 |
| Iron | .5 |

*Example No. 5*

| | Percent |
|---|---|
| Tungsten | 67 |
| Tantalum carbide | 29 |
| Nickel and iron | 4 |

In manufacturing tips for cutting tools or other objects of my improved composition the mass of ingredients is subjected to pressures and temperatures sufficient to effect the necessary reaction.

Thus 1200° C. may be considered the minimum temperature for commercial practice, while the maximum temperature limit is determined by the critical temperatures at which the reversal of equilibrium above referred to would occur. Thus maximum temperature in the case of pure tantalum carbide is approximately 2227° C. but I have found that the critical temperature is several hundred degrees higher when the tantalum carbide phase contains zirconium carbide and therefore the high limit of temperature is raised without danger of a reversal of equilibrium. I have used temperatures up to approximately 2500° C. The pressure should not be less than approximately two thousand pounds per square inch and not more than the crushing strength of the molds in which the object is being formed. In the case of carbon and graphite molds this crushing strength is approximately four thousand pounds per square inch. I have found that a pressure below two thousand pounds per square inch usually does not effect a snug surface contact between the particles necessary to produce a mechanically strong union.

It is obvious that the amount of pressure required depends on the mass of the composition being formed. Thus a small or thin piece of composition obviously requires less pressure.

I have found it advantageous to forge or mechanically deform while hot, namely about 1400° C. to 2000° C., my compositions comprising tantalum carbide and tungsten metal. This forging increases the toughness and strength of the composition for metal-cutting tools. It must be done in such a way as to avoid cracking, namely in a manner similar to swaging, in which support is afforded on more than two faces of the piece being forged. It should be conducted in an atmosphere free from oxygen, or in a vacuum. The force of the blows or the pressure should be great enough to deform the tungsten present.

I claim:—

1. A hard composition for the purposes described wherein the particles are in welded relation, consisting of tantalum carbide forming from 72% to 90% of the mass by weight with finely divided tungsten metal dispersed therethrough and forming from 28% to 10% of the mass by weight, the particles of the tungsten metal being of a size between one to one hundred millimicrons.

2. A hard composition for the purposes described wherein the particles are in welded relation, consisting of tantalum carbide forming from 82½% to 90% of the mass by weight with finely divided tungsten metal forming the balance of the mass by weight dispersed therethrough, the particles of the tungsten being of a size between one to one hundred millimicrons.

3. A hard composition for the purposes described wherein the particles are in welded relation, containing tantalum carbide in the proportion of approximately 80% of the mass by weight, tungsten metal in approximately 4% of the mass by weight, and palladium metal in approximately 16% of the mass by weight, the tungsten being in a finely divided state with the particles of a size between one to one hundred millimicrons.

PHILIP M. McKENNA.